Figure 1:
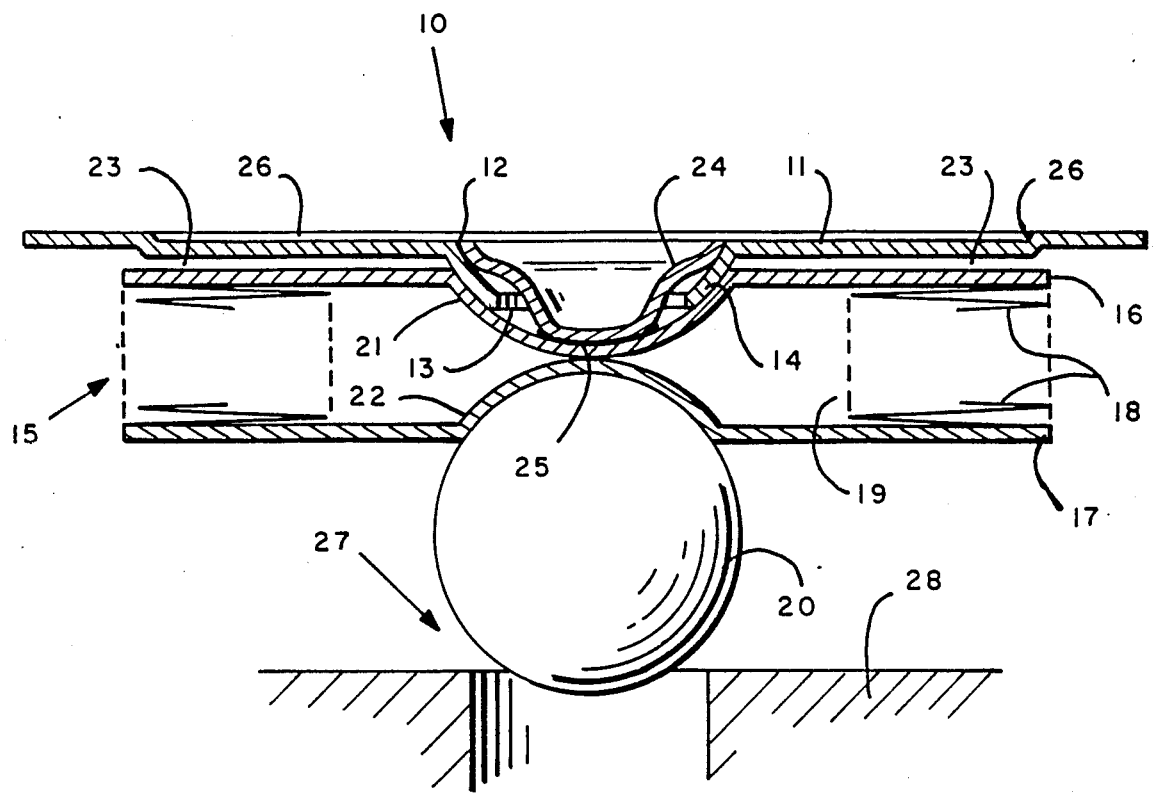

United States Patent [19]

Morgan

[11] Patent Number: 4,690,323

[45] Date of Patent: Sep. 1, 1987

[54] SWIVEL BELLOWS ASSEMBLY

[75] Inventor: David L. Morgan, Stratford, Conn.

[73] Assignee: Seymour-Sheridan, Inc., Stratford, Conn.

[21] Appl. No.: 901,330

[22] Filed: Aug. 28, 1986

[51] Int. Cl.4 .............................................. G05D 23/12
[52] U.S. Cl. ..................................... 236/99 F; 251/86; 403/123; 403/125
[58] Field of Search .................... 236/58, 93 A, 99 F, 236/99 J, 99 R; 403/76, 90, 122, 123, 125, 126; 251/86

[56] References Cited

U.S. PATENT DOCUMENTS

| | | | |
|---|---|---|---|
| 1,076,159 | 10/1913 | Schutt | 236/58 |
| 1,446,164 | 2/1923 | D'Eyraud | 403/125 X |
| 2,436,678 | 2/1948 | Somers | 403/123 |
| 2,571,443 | 10/1951 | Hair | 403/125 X |
| 3,204,898 | 9/1965 | Manning | 403/90 X |
| 3,483,888 | 12/1969 | Wurzel | 403/123 X |
| 4,157,876 | 6/1979 | Di Giulio | 403/125 X |

*Primary Examiner*—William E. Tapolcai
*Attorney, Agent, or Firm*—Thomas L. Tully

[57] ABSTRACT

A swivel bellows assembly designed to be mounted within a valve housing to provide self-alignment with a valve opening. The bellows assembly comprises a mounting element having a central opening surrounded by a depending, contoured skirt, or wall, a bellows unit having a central contoured well which receives said skirt or wall, and a retainer disc or cup which confines said skirt or wall within said well to permit relative angular adjustment of the bellows unit.

6 Claims, 2 Drawing Figures

SWIVEL BELLOWS ASSEMBLY

BACKGROUND OF THE INVENTION

The present invention relates to thermostatic assemblies incorporating a heat-expandable bellows having an integral work member, such as a valve plug which is moved with the expansion of the bellows to alter an opposed elements, such as to close an opposed valve opening.

Due to the eccentricities and tolerances of a bellows assembly and/or an associated housing, such as a valve body incorporating a valve opening, bellows assemblies must be precision-manufactured so that the valve plug or other work member is aligned to be concentric with the valve opening or other opposed element. Otherwise, the plug will not seat properly in the valve opening when the bellows expands, causing wear, leakage or undesired stresses.

In order to improve the ability of a bellows assembly to properly seat in a valve opening, thereby avoiding wear, leakage and undesired stresses, it is known to provide a swivel attachment between the bellows assembly and the valve housing. Reference is made to U.S. Pat. Nos. 1,076,159; 1,738,248; 1,929,684 and 4,560,105 for their disclosures of different swivel attachment structures for bellows assemblies.

The main disadvantages of known swivel bellows assemblies relate to the cost of producing and assembling the precision-mated parts thereof, and the requirement that the valve housing must be customized to incorporate a swivel base or socket for the swivel bellows.

SUMMARY OF THE INVENTION

The present invention relates to a novel bellows assembly having a standard mounting plate which incorporates a swivel-attached bellows, the mounting plate being adapted for attachment within standard housings of different designs for purposes of mounting a self-aligning, bellows-mounted work member such as a valve plug therein in association with an opposed element such as a valve opening.

The novel bellows assembly of the present invention includes a mounting plate having a central well opening having a depending wall, a bellows unit having a central well area which mates with said well opening, and a somewhat-hemispheric retainer disc or cup which is attached to said well area and which confines the depending wall of said mounting plate between itself and said bellows central well to provide a swivel attachment therebetween.

Since the mounting plate is easily and inexpensively formed to have a central well area having a somewhat-hemispherical depending wall, and since the retainer disc is also formed in simple and inexpensive manner, the present swivel bellows assemblies can be manufactured without resort to precision machining or mating of parts, and can be assembled by the simple welding of the retainer disc to the upper end plate of the bellows, with the backing plate confined therebetween, to form an assembly which is self-aligning when installed in any housing which accommodates the assembly.

THE DRAWINGS

Figure 2:
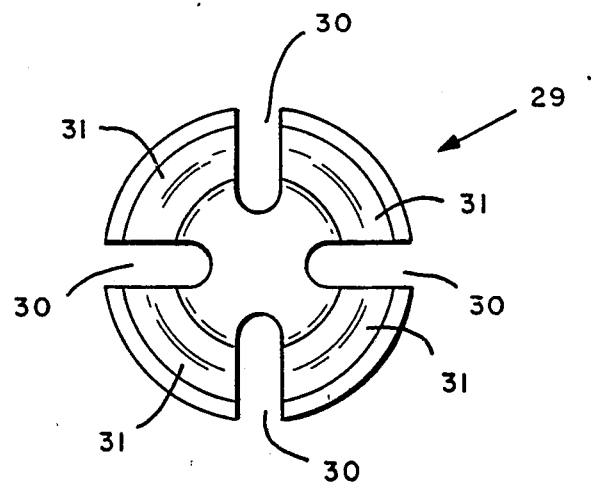

FIG. 1 is a diagrammatic cross-section of a swivel bellows assembly according to one embodiment of the present invention, shown in association with a valve opening, and FIG. 2 is a plan view of a flexible retainer disc suitable for use in place of the retainer disc of the assembly of FIG. 1.

DISCUSSION OF THE INVENTION

The swivel bellows assembly 10 of FIG. 1 comprises a metal mounting plate 11 having a central well opening 12 formed by punching a central hole 13 therein and then swaging or otherwise depressing the metal surrounding the hole to form a hemispheric or conical downwardly and inwardly tapered depending skirt or wall 14 forming the well opening 12.

The assembly 10 also comprises a conventional thermostatic bellows unit 15 comprising an upper end plate 16, a lower end plate 17, a plurality of edge-welded annuli free plates 18 forming an accordion-like sealed expansion housing 19 having a predetermined expansion temperature, such as steam temperature, and a valve plug 20.

In the illustrated embodiment, the end plates 16 and 17 are formed with central inverse wells 21 and 22, respectively, the interior surfaces of which contact each other to cushion and support the bellows 15 in retracted position, as illustrated. The valve plug 20 comprises a sphere which nests and is welded within the well 22 in the lower plate 17, while the depending contoured wall 14 of the mounting plate 11 partially nests in loose or frictional engagement within the well 21 of the upper bellows plate 16, the maximum outer diameter of the wall 14 beneath plate 11 being slightly larger than the maximum inner diameter of the well 21 so that the top surface of plate 16 is spaced from the undersurface of plate 11 to provide a swivel gap 23 therebetween when the elements are assembled.

Assembly of the mounting plate 11 and the bellows unit 15 is accomplished by inserting a somewhat-hemispheric retainer cup or contoured disc 24 within the upper well 21, to confine the depending wall 14 of plate 11 between itself and the outer surface of the upper well 21, and welding the central undersurface of the disc 24 to the central outer surface of the well 21 at 25, as illustrated.

In the embodiment shown in FIG. 1, the mounting plate 11 is formed to have an offset central area 26 which permits movement of the upper edge of disc 24 when the bellows unit 15 pivots slightly during expansion and alignment with the valve seat 27 of a valve housing 28, even where the mounting plate 11 is mounted against a flat surface of the valve housing.

Pivotal movement of the bellows unit 15 is also made possible by the swivel gap 23 provided between the plates 11 and 16 which permits the outer periphery of plate 16 to be moved closer to the undersurface of plate 11 in any direction when the bellows unit 15 pivots or swivels slightly during expansion as the valve plug 20 aligns itself with the valve opening 27. The engagement between the depending mounting plate wall 14, which is a contoured sleeve, and the rounded surface of the well 21, permits the bellows unit 15 to move angularly in relation to the mounting plate 11 to a degree that is determined by the width of the swivel gap 23. Generally, a fairly-narrow swivel gap is sufficient because the bellows assembly 10 and its valve plug 20 are designed to be mounted concentrically relative to the valve opening 27 of a valve housing. The swivel gap 23 allows for eccentricities and tolerances in the bellows assembly and valve housing.

FIG. 2 illustrates a more flexible retainer cup or disc 29 which is otherwise similar in design and function to the disc 24 of FIG. 1. Disc 29 differs from disc 24 in that a plurality of spaced slots 30 are provided from the upper edge or rim of the disc 29 downwardly towards the base thereof to form a plurality of flexible wall segments 31, the upper portions of which yieldingly-engage the depending wall 14 of the mounting plate 11 with a spring action which facilitates relative movement therebetween under stress and which presses the elements together in frictional engagement.

The novel bellows assemblies of the present invention may be fabricated inexpensively due to the fact that the swivel connection may be relatively loose, thereby avoiding the need for precision-formed or precision-assembled component parts, such as the mounting plate skirt 14 and retainer discs 24 and 29. However, where cost is not a factor, the component parts may be precision-formed and precision-assembled to provide a degree of frictional engagement therebetween and produce swivel bellows assemblies which align themselves into perfect concentricity, such as with the valve opening of a valve housing during the initial activation so that the valve plug seats perfectly within the valve opening during each subsequent actuation, thereby reducing wear on the plug and seat caused by frictional engagement therebetween.

It will be clear to those skilled in the art that the present invention is adaptable to use on bellows units having mounting elements of different shapes and designs, the essential requirement being that a swivel gap is provided between the underside of the mounting element and the upper surface of the bellows unit to permit angular movement of the bellows unit relative to the mounting element.

It will also be apparent that while the preferred assemblies of the present invention incorporate valve plugs as work members and valve openings as opposed elements, other work members such as connecting rods, pressure plates, switch actuators, etc., conventionally-used on bellows members may also be used on the present assemblies in association with cooperative opposed elements Variations and modifications of the present invention will be apparent to those skilled in the art within the scope of the present claims.

Having thus described the invention, what is claimed is:

1. A thermostatic swivel bellows assembly designed for attachment within a housing to perform a function in response to predetermined temperatures therewithin, said assembly comprising a bellows mounting plate having an opening surrounded by a portion of said plate which is downwardly and inwardly deformed to provide a tapered skirt, a thermostatic bellows unit having an upper end surface and a lower end surface, said upper end surface being adjacent said mounting plate and being provided with a central contoured well portion which receives the tapered skirt of the mounting plate, a flexible, contoured retainer cup which confines the skirt of the mounting plate in frictional engagement between itself and the well of said upper end surface and which extends through said opening and is permanently attached within said well portion to said upper end surface to permit swivel movement between said mounting plate and said bellows unit, said lower end surface being provided with a central work member for altering an opposed element when said bellows unit is expanded, said swivel movement permitting the bellows unit to align the work member with the opposed element during use.

2. A bellows assembly according to claim 1 in which said mounting plate comprises a flat plate which is substantially parallel to the upper end surface of the bellows assembly and is spaced therefrom in all directions by a narrow gap which permits the swivel movement of the bellows unit relative to the mounting plate.

3. A bellows assembly according to claim 1 in which said lower end surface is also provided with a central contoured well portion, within which said work member is attached, said upper and lower end surfaces contacting and supporting each other in the areas of said well portions when said bellows unit is in normal retracted condition.

4. A bellows assembly according to claim 1 in which said mounting plate has a recessed surface in the area adjacent said opening to receive the upper rim of said retainer cup when said bellows unit undergoes swivel movement.

5. A bellows assembly according to claim 1 in which said retainer cup is provided with a plurality of spaced slots extending downwardly from the rim thereof to increase the flexibility of said retainer cup to yieldably-engage the tapered skirt of the mounting element and provide yieldable frictional engagement therebetween.

6. A bellows assembly according to claim 1 in which said housing is a valve housing, said work member is a valve plug and said opposed element is a valve opening.

* * * * *